Figure 1:
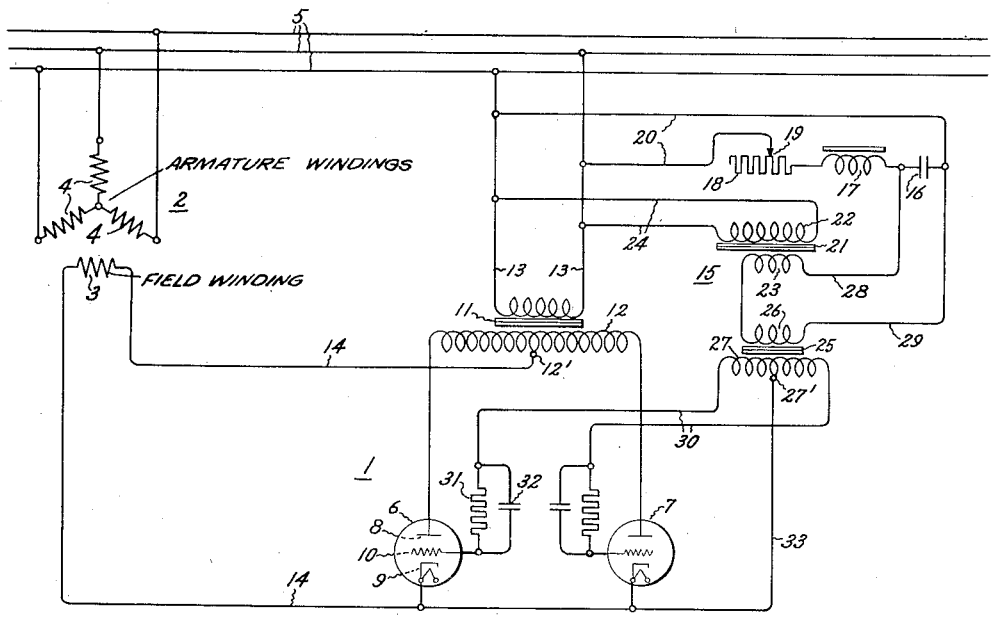

May 16, 1939. H. W. LORD 2,158,878
ELECTRIC CONTROL SYSTEM
Original Filed Jan. 2, 1936 2 Sheets-Sheet 1

Inventor:
Harold W. Lord,
by Harry E. Dunham
His Attorney.

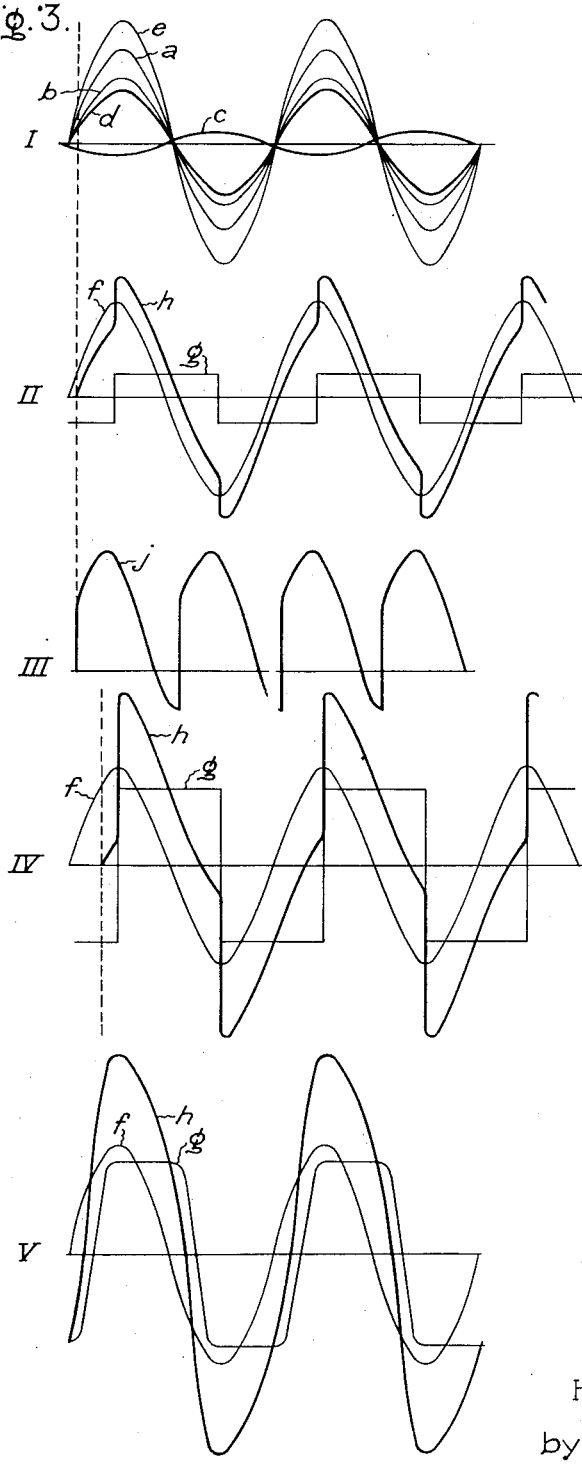

Patented May 16, 1939

2,158,878

UNITED STATES PATENT OFFICE 2,158,878

ELECTRIC CONTROL SYSTEM

Harold W. Lord, Schenectady, N. Y., assignor to General Electric Company, a corporation of New York Original application January 2, 1936, Serial No. 57,190. Divided and this application July 8, 1936, Serial No. 89,598

13 Claims.  (Cl. 172—274)

My invention relates to electric control systems and more particularly to electric valve circuits for controlling dynamo-electric machines.

This application is a division of my copending application Serial No. 57,190, filed January 2, 1936, entitled "Electric control system", and on which United States Letters Patent No. 2,085,596 were granted June 29, 1937 and assigned to the assignee of the present application.

Heretofore in electric control systems for electric translating apparatus, such as dynamo-electric machines and electric valve apparatus, there have been devised numerous arrangements for controlling the translating apparatus in accordance with an electrical condition such as the voltage of an associated circuit. Where it has been deemed expedient to control the translating apparatus in different manners within different ranges of the voltage of an associated circuit, the control apparatus required to accomplish this result has been expensive and complicated in construction and arrangement. For example, in the control of dynamo-electric machines of the synchronous type, there has been evidenced a decided need for control apparatus to maintain an operating condition, such as the torque of the machine, substantially constant within a predetermined range of voltages of the associated supply circuit and for controlling the torque or other operating condition in a different predetemined manner within different ranges of the voltages of the alternating current supply circuit. Furthermore, it has become evident that control apparatus for performing this function preferably should be of the type which is entirely electrical in operation requiring no moving parts and necessitating only the minimum amount of inspection and a minimum number of replacements.

It is an object of my invention to provide a new and improved control system for dynamo-electric machines.

Another object of my invention is to provide a new and improved control system for dynamo-electric machines, whereby an operating characteristic of the machine may be controlled in a predetermined manner within a predetermined range of an electrical condition of an associated circuit and whereby the operating condition of the machine may be varied in different predetermined manners within different ranges of the electrical condition of the associated circuit.

A further object of my invention is to provide a new and improved control circuit for dynamo-electric machines of the synchronous type whereby the field excitation of a machine is varied or maintained constant to effect control of an operating characteristic of the machine under varying electrical conditions of an associated circuit.

In accordance with the illustrated embodiment of my invention, I provide a control circuit for a dynamo-electric machine of the synchronous type wherein the energization of the field winding is varied or maintained constant to effect control of an operating condition of the machine under varying electrical conditions, such as the voltage of an associated alternating current supply circuit. In particular, the field winding of the dynamo-electric machine is energized from the alternating current circuit through electric valve translating apparatus which supplies direct current to the field winding. An excitation circuit is employed to control the conductivity of the electric valve means to effect the desired control of the energization of the field winding. The excitation circuit comprises a non-linear resonant circuit of the series type which is energized from the alternating current circuit and which includes a serially connected resistance, a self-saturable inductance and a capacitance, and a source of alternating voltage having a component corresponding in phase to the voltage of the alternating current supply circuit. The resultant of the voltage appearing across the capacitance and the alternating voltage provide a resultant periodic potential which is employed to control the conductivity of the electric valve means. This resultant periodic potential is impressed on the control members of the electric valve means. By virtue of the non-linearity of the non-linear resonant circuit, the resultant periodic potential obtains predetermined different phase relationships relative to the voltage of the alternating current circuit within different predetermined ranges of voltages of the alternating current circuit, thereby providing a means for controlling the electric valve means and the energization of the field winding in accordance with the voltage of the alternating current supply circuit.

For a better understanding of my invention reference may be had to the following description taken in connection with the accompanying drawings, and its scope will be pointed out in the appended claims.

Figure 2:
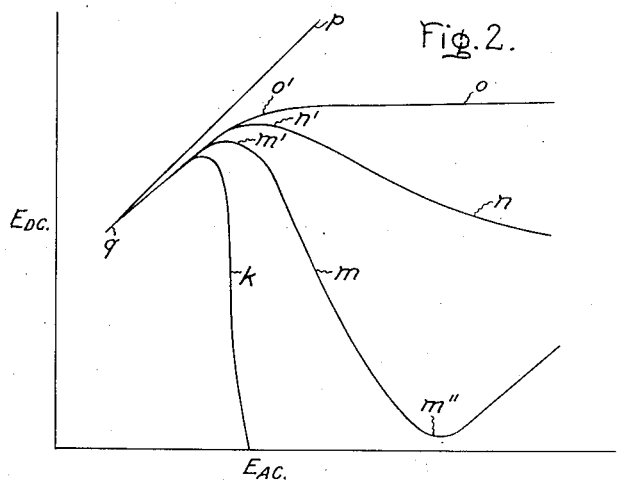

In the drawings, Fig. 1 represents diagrammatically an embodiment of my invention as applied to an electric valve circuit for energizing the field circuit of a dynamo-electric machine; while Fig. 2 represents certain operating characteristics of apparatus embodying my invention. Diagrams I to V of Fig. 3 also represent certain operating characteristics of the apparatus diagrammatically shown in Fig. 1.

Referring now to Fig. 1 of the drawings, my invention is diagrammatically shown as applied to an electric valve circuit 1 for supplying direct current to a field winding 3 of a dynamo-electric machine 2, having a three-phase stator winding 4. The electric valve circuit 1 and the stator winding 4 are energized from a three-phase alternating current circuit 5. The electric valve translating circuit 1 may comprise any suitable valve aggregate for transmiting energy to the field circuit 3 and I have shown by way of example a pair of electric valves 6 and 7, preferably of the vapor electric type, having anodes 8, cathodes 9 and control electrodes 10. A transformer 11, having a secondary winding 12 and an electrical mid-tap 12,' is energized from the alternating current circuit 5 through conductors 13, and is employed to connect the valves 6 and 7 for full wave rectification. The field winding 3 of machine 2 is connected to the electric valve circuit 1 by means of conductors 14.

To provide means for controlling the conductivity of electric valves 6 and 7, I provide an excitation circuit 15 which responds to an electrical condition of the alternating current circuit 5, to control the voltage impressed upon the respective control electrodes 10 of valves 6 and 7. The excitation circuit 15 may be arranged to control the electric valve circuit 1 in a manner to provide a predetermined operating characteristic over a certain range of voltage of the circuit 5 and to provide a different operating characteristic over a different range of voltages. The excitation circuit 15 comprises a non-linear resonant circuit of the series type employing a capacitance 16, and self-saturating inductance or reactor 17 and an adjustable resistance 18 having a movable tap or contact 19. By non-linear resonant circuit, I refer to that type of circuit which may include a condenser of proper capacitance connected in series with a reactance coil having a closed magnetic core and a source of alternating electromotive force. The current in the circuit varies in a non-linear relation to the impressed voltage. That is, as the voltage in the circuit is gradually increased the current increases substantially linearly with the voltage until a certain value of voltage is reached at which saturation of the core of the inductance takes place and the inductance of the coil resonates with the capacitance of the condenser. The current then suddenly jumps to a very high value which is several times the value of current prior to the sudden increase. As the electromotive force is increased still further, the current again increases with respect to the impressed voltage in a substantially linear relation. These circuits may be said to have the property of non-linear, or ferro, resonance. Conductors 20 are employed to connect the non-linear series circuit to one phase of the alternating current circuit 5. A transformer 21 having a primary winding 22 and a secondary winding 23 and energized from the alternating current circuit 5 by conductors 24 is employed to furnish a sinusoidal voltage with which an electrical quantity of the non-linear circuit is combined to control the conductivity of valves 6 and 7. The resultant of the voltage appearing across capacitance 16 and the voltage appearing across winding 23 of transformer 21 is impressed upon primary winding 26 of transformer 25 by means of conductors 28 and 29. The terminals of the secondary winding 27 are connected to the control electrodes 10 of electric valves 6 and 7 through conductors 30 and self-biasing circuits each comprising a current limiting resistance 31 and a capacitance 32. A mid-point 27' of secondary winding 27 is connected to the cathodes 9 of electric valves 6 and 7 by means of a conductor 33.

Although my invention is represented as being applied to a system for energizing the field winding of a dynamo-electric machine, it should be understood that it may be applied to electric circuits generally.

The operation of the embodiment of my invention diagrammatically shown in Fig. 1 may be best explained by considering the arrangement when unidirectional current is being supplied to the field winding 3 of the dynamo-electric machine 2 from alternating current circuit 5 by means of electric valves 6 and 7 and the associated transformer 11. If it be assumed that the voltage of circuit 5 is less than the voltage at which the non-linear circuit resonates, the arrangement will function as a bi-phase rectifier, and there will be substantial phase coincidence between the voltages impressed on the control electrodes 10 and the voltages impressed on valves 6 and 7. As will be understood by those skilled in the art, if there is substantial phase coincidence between the voltages impressed upon the control electrodes 10 and the voltages impressed between the respective anodes 8 and the cathodes 9, the average current conducted by the valves will be maximum and the direct current voltage will be maximum. As the phase of the voltage impressed upon the control electrodes 10 is retarded relative to the voltage impressed between the anodes 8 and cathodes 9 of the electric volves 6 and 7, the average current conducted by the valves will be decreased to effect a decrease in voltage of the direct current circuit 14.

In the particular arrangement of my invention shown in Fig. 1, the electric valve circuit 1 is arranged so that upon decrease in the voltage of the alternating current circuit 5, the voltage of the direct current circuit 14 may be maintained constant or may be increased or decreased. If it is desired to obtain an increase in the voltage of the direct current circuit 14 upon decrease in the voltage of alternating current circuit 5, the excitation circuit 15 is arranged so that during a normal range of voltage of the alternating current circuit 5 the voltages impressed upon the control electrodes 10 of electric valves 6 and 7 lag the voltages impressed between the respective anodes and the cathodes by an appreciable angle cr phase displacement. This phase relationship is accomplished by selecting the constants of the non-linear circuit so that for operation above a predetermined range of voltages of the alternating current circuit 5 the excitation circuit 15 effects a retardation in the phase of the voltages impressed on the control electrodes 10. The critical resonance voltage of the non-linear circuit is chosen relative to the voltage of circuit 5 so that as the voltage of circuit 5 decreases, the phase of the potentials impressed upon the control members 10 is advanced to increase the average current conducted by the valves, effecting thereby a net increase in the voltage of direct current circuit 14.

The operation of the excitation circuit 15 may be best explained by considering the diagrams of Fig. 3 of the drawings. Referring to Diagram I, the curve a represents the anode-cathode voltage impressed upon one of the electric valves, for example, electric valve 6. This voltage is considerably less than the critical resonance voltage of the non-linear circuit of excitation circuit 15. The curve $b$ represents the voltage appearing across the secondary winding 23 of transformer 21 and the curve $c$ represents the voltage appearing across the capacitance 16, while the curve $d$ represents the resultant voltage impressed upon the primary winding 26 of transformer 25. During operation below the critical resonance voltage, it will be apparent that the voltage appearing across the capacitance 16, and represented by curve $c$, is relatively small compared with the other voltages existing in the excitation circuit 15 and that the capacitance voltage lags the voltage of circuit 5 by substantially 180 electrical degrees. However, as the voltage of alternating current circuit 5 approaches the critical resonance voltage of the non-linear circuit, represented by the curve $e$ of Diagram I, the voltage of capacitance 16 is increased in magnitude and advanced in phase to effect a retardation of the voltage impressed upon the control electrode 10.

Diagram II represents certain voltages in the excitation circuit as the voltage of the alternating current circuit 5 approaches the resonance voltage. Curve $f$ of Diagram II represents the voltage now appearing across the secondary winding 23 of transformer 21 and curve $g$ represents the voltage appearing across the capacitance 16, while curve $h$ represents the resultant voltage impressed upon the primary winding 26 of transformer 25. It will be understood that as the voltage of the alternating current circuit 5 approaches the critical resonance voltage, the resultant voltage, represented by curve $h$, impressed upon the primary winding 26 of transformer 25 is retarded in phase relative to the voltage of the alternating current circuit 5, and hence effects a retardation in phase of the voltage impressed upon the control electrodes 10 of electric valves 6 and 7 relative to the anode-cathode potentials of these values. Under the conditions of operation represented by the curves of Diagram I, since there is substantial phase coincidence between the voltages impressed upon the control electrodes 10 of electric valves 6 and 7 and the voltages impressed upon the electric valves, the output voltage will be maximum for a certain impressed voltage. However, under the conditions of operation represented by the curves of Diagram II, since the voltages impressed upon the control electrodes 10 have been retarded in phase relative to the voltages impressed between the anodes and cathodes, the average current conducted by the electric valves will be substantially less than the average current conducted under the conditions of operation represented in Diagram I. The voltages impressed upon the direct current circuit 14 by the electric valves 6 and 7 under the operating conditions represented by the curves of Diagram II, that is, when the voltages impressed upon the control electrodes 10 lag the voltages impressed upon the electric valves 6 and 7 by the transformer II, is represented by the curve $j$ of Diagram III. It should be understood that curve $j$ represents the voltage of circuit 14 when there is appreciable inductance in the circuit.

The curves of Diagram IV represent the circuit voltages appearing in the excitation circuit 15 and the phase displacement obtainable by using different constants for the elements 16, 17 and 18 to obtain a greater phase displacement than that shown in Diagram II. It will be understood that by a proper choice of constants for the non-linear circuit comprising capacitance 16, self-saturating inductance 17 and resistance 18, it is possible to control the range of phase displacement obtainable between the voltages impressed upon the control electrodes 10 of electric valves 6 and 7 and the voltages impressed between the anodes 8 and the cathodes 9 of these valves, and hence to obtain a considerable variation in the control of the voltage of direct current circuit 14.

Diagram V represents the voltages appearing in the excitation circuit 15 when the voltage of circuit 5 is increased beyond the critical resonance voltage region where the resistance 18 has a suitable value; curve $f$ represents the voltage appearing across the secondary winding 23 of transformer 21, curve $g$ represents the voltage appearing across the capacitance 16, and curve $h$ represents the resultant voltage impressed upon the primary winding 26 of transformer 25. It will be noted that the voltage of capacitance 16 is advanced in phase relative to the voltage of transformer winding 23 and is increased in magnitude to effect a decrease in phase displacement between the voltage $h$ impressed upon primary winding 26 of transformer 25 and the voltage of the circuit 5 as the latter voltage increases beyond the region of the critical resonance voltage.

In Fig. 2 of the drawings there are shown curves representing the variation in the voltage of the direct current circuit 14 as a function of the voltage of alternating current circuit 5 for various values of the resistance 18 where the load circuit 14 comprises inductance. Curves $k$, $m$, $n$ and $o$ represent the relation between the voltage of direct current circuit 14 and the voltage of alternating current circuit 5 for different values for the resistance 18, of increasing value in the order named, while curve $p$ is merely a reference line. By the choice of values for resistance 18 relative to the voltage of the alternating current supply circuit 5 and the values of capacitance 16 and inductance 17, it is possible to obtain a variety of operating characteristics for the apparatus employed. For example, with a relatively high value of resistance for the element 18, represented by curve $o$ of Fig. 2, it is possible to obtain a substantially constant voltage in circuit 14 for voltages in circuit 5 above a predetermined value. From the point $q$ to the point $o'$ on curve $o$, the increase in the direct current voltage is effected by the increase in the voltage impressed upon the electric valves 6 and 7. During this range of voltages the circuit is operating below the critical resonance voltage region and as a result thereof there is substantial phase coincidence between the potentials impressed upon the control electrodes 10 and the potentials impressed between the anodes 8 and the cathodes 9 of electric valves 6 and 7. At the voltage represented by point $o'$ of the curve $o$, the voltage of the alternating current circuit 5 approaches the critical resonance voltage region for the excitation circuit 15 and effects thereby a retardation in the phase of the voltage impressed upon the control electrodes 10. Upon further increase in the voltage of the alternating current circuit 5, there is effected a further retardation in the voltage impressed upon the control electrodes to maintain a substantially constant voltage of the direct current circuit 14 represented by the portion of curve $o$ beyond point $o'$. By choosing a smaller value of resistance for the element 18, it is possible to obtain operating characteristics represented by the curves $k$, $m$ and $n$.

The operating characteristic represented by curve m of Fig. 2 is of particular interest since it shows a substantially linear increase in value of the direct current voltage for increases in the alternating current voltage between the points q and m'. Upon further increase in the alternating current voltage into the region of the critical resonance voltage of the excitation circuit 15, represented by the curves of Diagram IV of Fig. 3, there is effected a retardation in the phase displacement of the resultant excitation circuit voltage relative to the voltage e of the alternating current circuit 5 to effect a progressive decrease in the voltage of direct current circuit 14 represented by the portion of the curve between points m' and m''. It will be noted that the control of the conductivity of electric valves 6 and 7 in the vicinity of point m'' of curve m is continuous and that the transition from one portion of curve m to another portion thereof is effected in a smooth and continuous manner. For voltages greater than the voltage corresponding to the point m'' there is effected a progressive advancement in the phase of the voltages impressed upon the control electrodes 10 relative to the voltages impressed upon electric valves 6 and 7, which increases the average current conducted by electric valves 6 and 7 to increase the voltage of the direct current circuit 14. The phase relationships of the voltages appearing in excitation circuit 15 within the range of voltages represented by m' and m'' of curve m, are represented in Diagram IV of Fig. 3, while the phase relationships for voltages of circuit 5 having a greater value than the represented by point m'' on curve m are shown in Diagram V.

If the constants of the excitation circuit 15 are chosen to obtain an operating characteristic as represented by the curve n of Fig. 2, the electric valve circuit 1 may be made to operate to control the energization of the field winding 3 of the dynamo-electric machine 2 to maintain a predetermined pull-out torque under varying voltage conditions of circuit 5. If the excitation circuit 15 is designed to operate in the region beyond n' on curve n, the excitation circuit will effect an increase in the voltage impressed upon direct current circuit 14 as the voltage of alternating current circuit decreases. In this manner, as the voltage of the alternating current circuit is decreased, the energization of the field winding 3 will be increased to maintain a predetermined minimum pull-out torque. Of course, to obtain this characteristic the voltage of the alternating current circuit 5 must be in the region of the critical resonance voltage of the non-linear circuit of excitation circuit 15. The rates at which the energization of the field winding 3 is varied in response to variations in the voltage of the alternating current circuit 5 may be controlled by choosing various different values for the resistance 18.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, a dynamo-electric machine having a field winding, a translating circuit comprising an electric valve for energizing said field winding, and means comprising a source of alternating voltage and a non-linear resonant circuit energized from said alternating current circuit for providing conjointly a periodic potential to control the conductivity of said electric valve to change progressively the energization of said field winding in one direction for a predetermined direction of change of an electrical condition of said machine within a predetermined range of said condition and to change progressively in the opposite direction the energization of said field winding for the same direction of change of said condition within a different predetermined range of said condition.

2. In combination, an alternating current circuit, a dynamo-electric machine having a field winding, electric valve means interposed between said circuit and said field winding for energizing said field winding, and an excitation circuit comprising a source of alternating current and a non-linear resonant circuit for controlling said electric valve means for progressively increasing the energization of said field winding for voltages of said alternating current circuit above a predetermined value for one direction of change of the voltage of said alternating current circuit and for progressively increasing the energization of said field winding for voltages of said alternating current circuit less than said predetermined value for the opposite direction of change of the voltage of said alternating current circuit.

3. In combination, an alternating current circuit, a dynamo-electric machine having a field winding and being energized from said alternating current circuit, electric valve means for supplying unidirectional current to said field winding from said alternating current circuit, and means comprising a non-linear resonant circuit energized from said alternating current circuit and a source of alternating voltage for controlling the conductivity of said valve means in a predetermined manner for a predetermined direction of change of voltage within one range of voltages of said alternating current circuit and for controlling the conductivity of said valve means in a different manner within a different range of voltages of said alternating current circuit for the same direction of voltage change.

4. In combination, an alternating current supply circuit, a dynamo-electric machine energized from said alternating current circuit and having a field winding, electric valve means for supplying unidirectional current to said field winding from said alternating current circuit, and means comprising a non-linear resonant circuit energized from said alternating current circuit and a source of alternating potential for maintaining the average current conducted by said valve means substantially constant within a predetermined range of voltages of said alternating current circuit and for effecting a decrease in the average current conducted by said electric valve means for voltages below said predetermined range.

5. In combination, an alternating current circuit, a dynamo-electric machine connected to be energized from said alternating current circuit and having a field winding, electric valve means interposed between said alternating current circuit and said field winding for supplying direct current to said field winding, and an excitation circuit for controlling said electric valve means comprising a non-linear resonant circuit energized from said alternating current circuit and a source of alternating voltage for providing conjointly a periodic control potential having a progressively increasing phase displacement relative to a predetermined direction of change of the voltage of said alternating current circuit within a predetermined range of voltages of said circuit and having a progressively decreasing phase displacement relative to the same direction of change of voltage of said alternating current circuit for voltages of said circuit above said predetermined range.

6. In combination, an alternating current supply circuit, a dynamo-electric machine connected to said alternating current circuit and having a field winding, electric valve means interposed between said alternating current circuit and said field winding for supplying direct current to said field winding, and an excitation circuit comprising a non-linear resonant circuit energized from said alternating current circuit and a source of alternating voltage of substantial phase coincidence with the voltage of said alternating current circuit for providing a periodic control potential for controlling said electric valve means to decrease progressively the energization of said field winding for a predetermined direction of change of voltage within a predetermined range of voltages of said alternating current circuit and to increase progressively the energization of said field winding for the same direction of change of voltage within different predetermined ranges of voltages of said alternating current circuit.

7. In combination, an alternating current circuit, a dynamo-electric machine of the synchronous type having a stator winding connected to said alternating current circuit and having a field winding, electric valve means including a control member interposed between said alternating current circuit and said field winding for controlling the energization of said field winding, and an excitation circuit comprising a non-linear resonant circuit of the series type energized from said alternating current circuit and a source of voltage of substantial phase coincidence with the voltage of said alternating current circuit for providing a periodic control potential of progressively increasing phase displacement relative to the voltage of said alternating current circuit for controlling said electric valve means to decrease progressively the energization of said field winding for a predetermined direction of change of voltage within a predetermined range of voltages of said alternating current circuit and of progressively decreasing phase displacement relative to the voltage of said alternating current circuit to increase progressively the energization of said field winding for the same direction of change of voltage within a different predetermined range of voltages of said alternating current circuit.

8. In combination, an alternating current circuit, a dynamo-electric machine of the synchronous type having a stator winding connected to said alternating current circuit and having a field winding, electric valve means interposed between said alternating current circuit and said field winding for supplying direct current to said field winding, and an excitation circuit for controlling the conductivity of said electric valve means comprising a non-linear resonant circuit energized from said alternating current circuit and a source of alternating potential of substantial phase coincidence with the voltage of said alternating current circuit for providing a periodic control potential for controlling said electric valve means to maintain the energization of said field winding substantially constant for voltages of said alternating current circuit above a predetermined range of voltages.

9. In combination, an alternating current circuit, a dynamo-electric machine having a stator winding energized from said alternating current circuit and having a field winding, electric valve means having control members and being interposed between said alternating current circuit and said field winding for supplying direct current to said field winding, and an excitation circuit connected to said alternating current circuit for energizing said control members comprising a voltage sensitive circuit for impressing on said control members a periodic control potential having a predetermined phase displacement of substantially constant value relative to the voltage of said alternating current circuit within a predetermined range of voltages of said alternating current circuit and for effecting a progressive increase in phase displacement of said periodic control potential for voltages of said alternating current circuit within a different predetermined range of voltages and for effecting a progressive decrease in phase displacement of said periodic control potentials for voltages beyond said second mentioned range of voltages, said displacements occurring for a progressive increase in the voltage of said alternating current circuit.

10. In combination, an alternating current circuit, a dynamo-electric machine having a field winding, electric valve means interposed between said circuit and said field winding for energizing said field winding, and an excitation circuit energized from said alternating current circuit comprising voltage sensitive means including a source of alternating voltage and a non-linear resonant circuit for providing a periodic control voltage to control said electric valve means to effect a progressive increase in the energization of said field winding for a predetermined direction of change of voltage within a predetermined range of voltages of said alternating current circuit and to effect a progressive decrease in the energization of said field winding for the same direction of voltage change within a predetermined different range of voltages of said alternating current circuit.

11. In combination, an alternating current circuit, a dynamo-electric machine having a field winding, electric valve means interposed between said circuit and said field winding for energizing said field winding, and an excitation circuit including a source of alternating voltage and a non-linear resonant circuit energized from said alternating current circuit and means responsive to a predetermined electrical quantity of said non-linear circuit and the voltage of said source for controlling said electric valve means to effect a progressive increase in the energization of said field winding within a predetermined range of voltages of said alternating current circuit below a predetermined value for one direction of change in the voltage of said alternating current circuit and to effect a continuous control of the energization of said field winding through said voltage of predetermined value and to effect a progressive decrease in the energization of said field winding within a predetermined different range of voltages of said alternating current circuit above said predetermined value for the same direction of change of the voltage of said alternating current circuit.

12. In combination, an alternating current circuit, a dynamo-electric machine having a winding connected to said alternating current circuit and having a field winding for controlling said machine, electric valve means for controlling the energization of said field winding and having an anode, a cathode and a control member, and means comprising a source of alternating voltage and a non-linear resonant circuit energized in accordance with an electrical condition of said alternating current circuit for impressing on said control member a periodic potential having a progressively increasing phase displacement relative to the voltage impressed on said anode to decrease progressively the torque of said machine for a predetermined direction of change of voltage within a predetermined range of voltages of said alternating current circuit and having a progressively decreasing phase displacement relative to the voltage impressed on said anode to increase progressively the torque of said machine for the same direction of change of voltage within a predetermined range of voltages of said alternating current circuit above said first mentioned range.

13. In combination, an alternating current circuit, a dynamo-electric machine having a stator winding connected to said alternating current circuit and having a field winding, electric translating apparatus interposed between said alternating current circuit and said field winding comprising an electric valve means for energizing said field winding and having an anode, a cathode and a control member, and an excitation circuit for controlling an operating condition of said machine in accordance with an electrical condition of said alternating current circuit comprising a non-linear resonant circuit energized in accordance with said electrical condition of said alternating current circuit and a source of voltage of substantial phase coincidence with the voltage of said alternating current circuit for impressing on said control member a periodic control potential having a substantially constant phase displacement relative to the voltage impressed on said anode for a predetermined range and direction of change of said electrical condition and having a progressively decreasing phase displacement relative to the voltage impressed on said anode to maintain the energization of said field winding substantially constant within a predetermined range of said electrical condition above said first mentioned range for the same direction of change of said electrical condition.

HAROLD W. LORD.